United States Patent [19]
Ostwald et al.

[11] Patent Number: 6,155,766
[45] Date of Patent: Dec. 5, 2000

[54] SMALL LIBRARY ROBOTICS GUIDANCE MECHANISM

[75] Inventors: Timothy C. Ostwald, Louisville; Daniel James Plutt, Superior, both of Colo.

[73] Assignee: Storage Technology Corporation, Louisville, Colo.

[21] Appl. No.: 09/390,923

[22] Filed: Sep. 7, 1999

[51] Int. Cl.[7] ................................. G11B 15/68
[52] U.S. Cl. .................. 414/279; 104/130.07; 414/648; 360/92
[58] Field of Search ................ 414/277, 279, 414/648; 104/130.07

[56] References Cited

U.S. PATENT DOCUMENTS

| | | | |
|---|---|---|---|
| 3,298,552 | 1/1967 | Kuhner et al. | 414/648 |
| 4,984,897 | 1/1991 | Baranski | 360/92 |
| 5,059,772 | 10/1991 | Younglove | 360/92 X |
| 5,237,468 | 8/1993 | Ellis | 360/92 |
| 5,495,374 | 2/1996 | Hiscox et al. | 360/93 |
| 5,513,947 | 5/1996 | Helms et al. | 414/751 |
| 5,551,350 | 9/1996 | Yamada et al. | 414/279 X |

FOREIGN PATENT DOCUMENTS 3200605  9/1991  Japan ..................... 414/279

*Primary Examiner*—Steven A. Bratlie
*Attorney, Agent, or Firm*—Brooks & Kushman P.C.

[57] ABSTRACT

A robotic guidance mechanism for transporting storage media cartridges along linear and curved routes within a data storage library. The guidance mechanism includes a robotic assembly operating on a guide rail. Two guides of the robotic assembly move in two guide paths in the guide rail to route and orient the robotic assembly in a plane defined by the guide rail. A third guide of the robotic assembly engages a guide surface on the guide rail to prevent the robotic assembly from rotating out of the guide rail plane. A picker assembly is provided in the robotic assembly to handle one of the storage media cartridges.

34 Claims, 11 Drawing Sheets

SMALL LIBRARY ROBOTICS GUIDANCE MECHANISM

TECHNICAL FIELD

The present invention relates to the field of data storage library robotics having a robotic assembly operating on a guide rail.

BACKGROUND ART

Typical data storage libraries use mechanical robots and/or linkages to pick and place data storage cartridges into media drives and empty cartridge slots. Freedom of movement of the robotics is governed by the mechanical constraints of the system, and is limited by the nature of design to be a function of the number of directions (axis) of movement required. In most cases, a data storage library layout is structured around the desired cost and complexity of the robotics. Designers are limited in the storage media cartridge selection and design options by the robotics freedom of movement.

Robotic movement is controlled by some type of actuator, where the number of actuators is often equal to, but not limited by the number of directions the robot moves. The robot is often a self-supporting mechanism having a picker assembly at the end of an arm that can be moved in two or more directions. The picker assembly is positioned in proximity to the cartridge slot or media drive using electronic encoders on the actuators, or using an optical position sensor at the end of the arm. Correcting for positional errors of the picker assembly result in excess wear and lower reliability of the robot.

Some attempts have been made to alleviate the constraints of stand alone robotic arms by implementing carousel structures, draw cable devices, and track/rail type systems. These systems have some sort of track or guide rail and a carriage that moves the storage media cartridges to and from the media drives. The track forms a guide path that directs the carriage to any desired position, be it in the continuous loop of a carousel, a straight line following a draw cable, or other combinations of straight and curved sections. Positioning errors of the cartridge are limited to one direction, that direction being along the length of the track.

Carriage and track system configurations are limited by the geometry of the track, in particular curved sections, and the number of mechanical contacts the carriage make to the track. Tracks with broad curves may not fit the allocated space claims. Tracks with sharp curves are difficult for the carriage to traverse. The mechanical contacts between the carriage and tracks are typically wheels with horizontal axis of rotation. The nature of such wheels is to bind when forced into corners. An alternate solution is to use pairs of wheels with vertical axis of rotation to pinch sideways on a guide rail. While this solves the cornering problem, the number of wheels and other support points requires may not be desirable. A third solution uses guide wheels tipped at an angle, or wheels with V-shaped grooves, to carry the carriage around corners. In these situations, the loads imposed on the wheels by the mass of the carriage may cause the wheels to lift off of the rails causing derailments.

A track/guide rail and carriage guidance mechanism is desired having the design flexibility to include both straight and curved sections in the track, including sharp corners. The preferred solution has a minimal number of contacts between the carriage and track while allowing for high speed carriage movements and stability around sharp corners.

DISCLOSURE OF INVENTION

The present invention is a robotic guidance mechanism for transporting storage media cartridges within a data storage library. The guidance mechanism includes a robotic assembly operating on a guide rail. The guide rail defines a straight, curved, or curve-linear routes through the data storage library. Two guides of the robotic assembly move in two guide paths provided in the guide rail to route and orient the robotic assembly in a plane defined by the guide rail. A third guide of the robotic assembly engages a guide surface on the guide rail to prevent the robotic assembly from rotating out of the guide rail plane. Support for the robotic assembly's weight is carried by at least two guides. The guides may be rotatably or non-rotatably attached to the robotic assembly. A picker assembly is provided in the robotic assembly to load and unload the storage media cartridges.

Propulsion for the robotic assembly may be provided by an on-board motor, by an off-board motor, or by a linear motor formed between the robotic assembly and the guide rail. An on-board motor provides movement for robotic assembly by rotating one or more of the guides, preferably the third guide. In the preferred embodiment, the third guide is a drive gear engaged with a rack gear on the guide surface. An off-board motor provides movement by driving a belt coupled to the robotic assembly. A linear motor consisting of a coil assembly mounted on the guide rail and a reaction plate mounted on the robotic assembly, or vice-versa, may also provide movement for the robotic assembly.

Accordingly, it is an object of the present invention to provide a robotic guidance mechanism for transporting storage media cartridges along a straight and/or curved route within a data storage library.

Another object of the present invention is to provide a guide rail for use within the data storage library to define the route for transporting the storage media cartridges.

Yet another object of the present invention is to provide a robotic assembly for use within the data storage library to carry the storage media cartridges along the route defined by the guide rail.

These and other objects, features and advantages will be readily apparent upon consideration of the following detailed description in conjunction with the accompanying drawings.

BEST MODE FOR CARRYING OUT THE INVENTION

Figure 1:
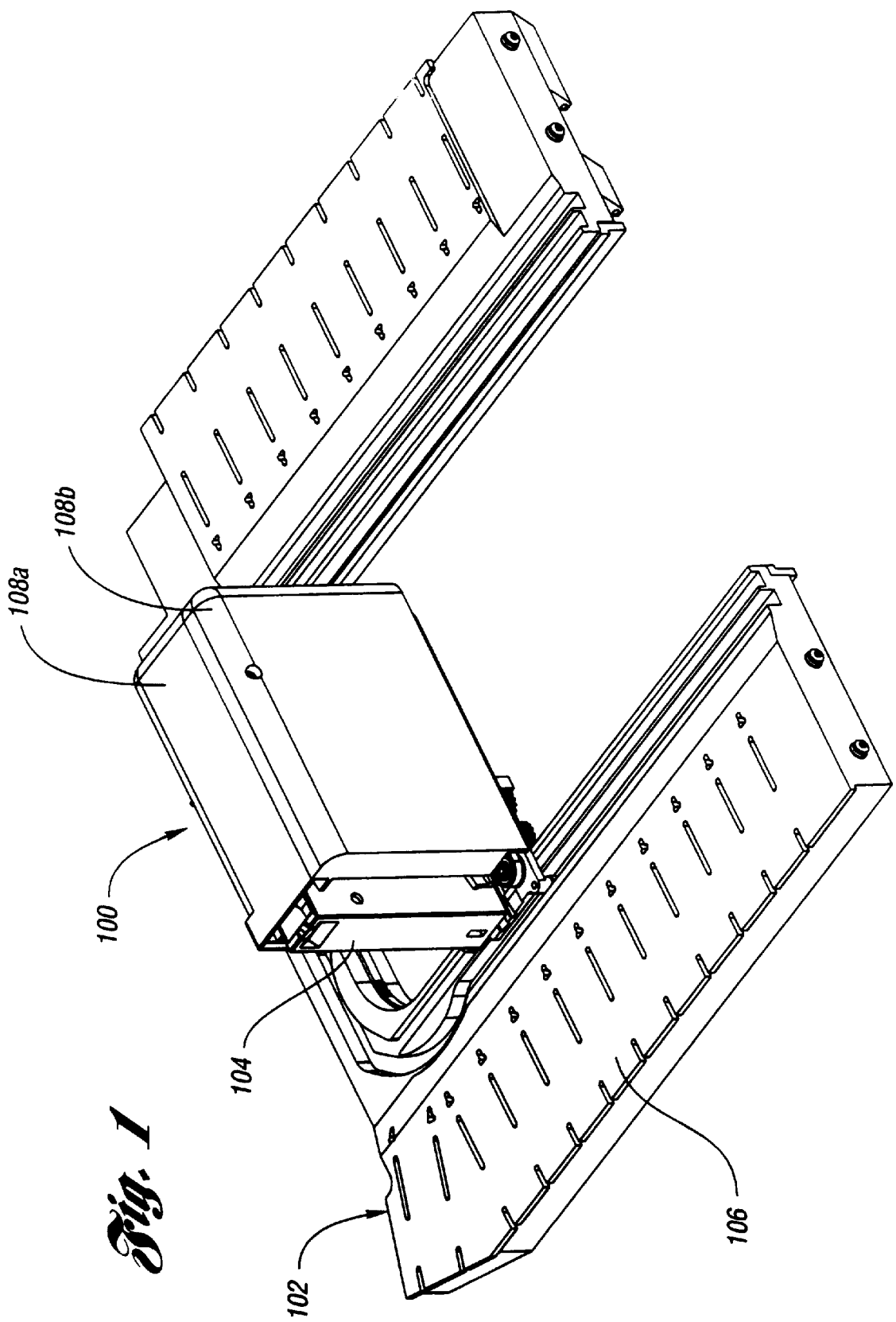
FIG. 1 is a perspective view of a first embodiment of the present invention.

A robotic guidance mechanism implementing the present invention is shown in FIG. 1. The mechanism includes a robotic assembly 100 riding on a guide rail 102. Robotic assembly 100 is capable of transporting one storage media cartridge 104 at a time along to guide rail 102 between multiple cartridge slots 106, one or more media drives (not shown), and other media handling devices (not shown) such as input/output ports and bar code readers. The guide rail consists of one or more sections, where each section may be linear, curved, or both. This ability to include curved sections in the guide rail 102, and the ability of the robotic assembly 100 to traverse these curves, allow the data storage library designer great flexibility in the layout of the library. In the preferred embodiment, the side walls (not shown) of the cartridge slots 106 are mounted directly to the guide rail 102. In other embodiments, the cartridge slots 106 are fabricated independently from the guide rail 102, and then mounted at a fixed position with respect to the guide rail 102. For example, some or all of the cartridge slots 106 may be part of one or more removable magazines.

Figure 2:
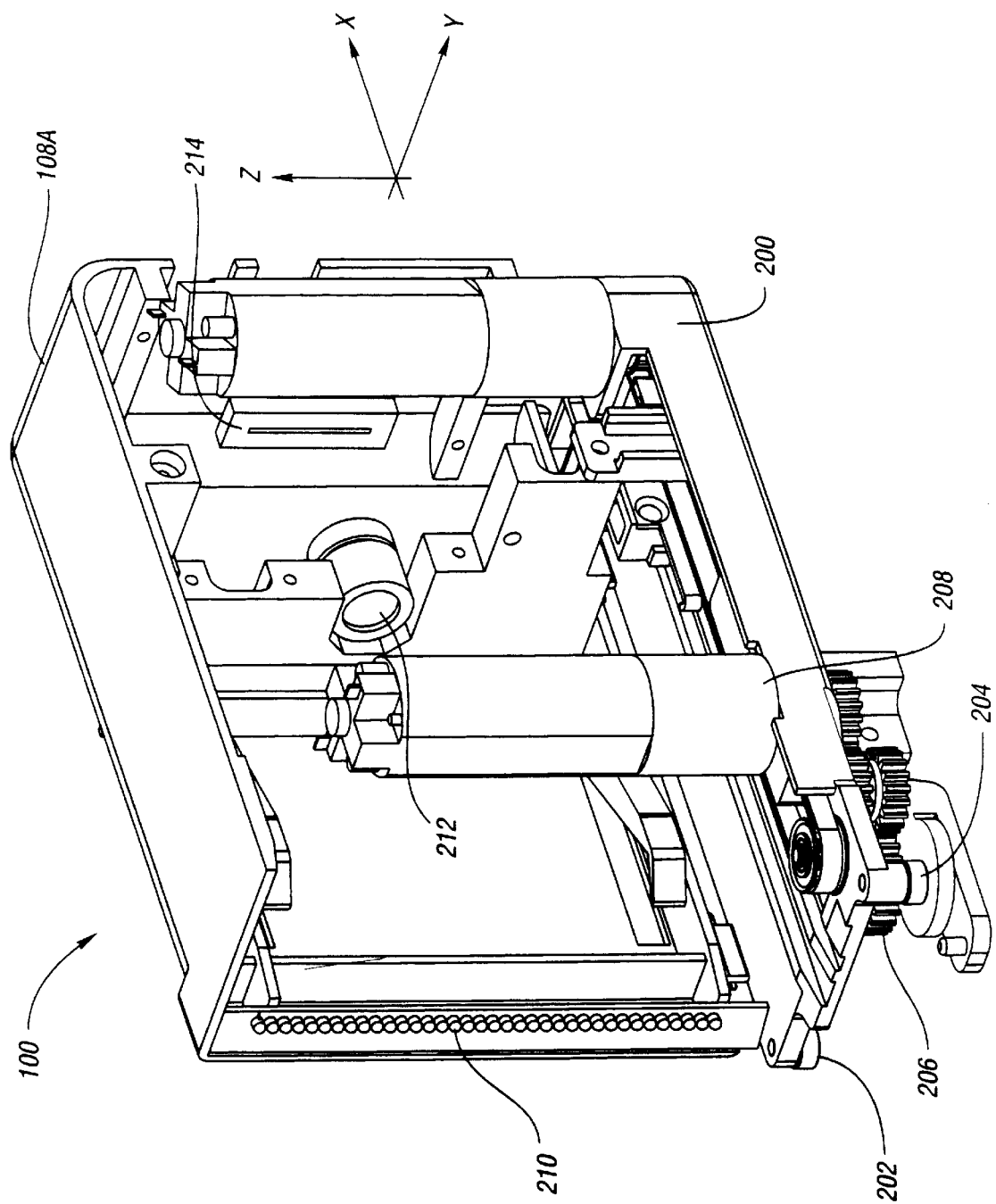
FIG. 2 is a perspective view of the robotic assembly with half of the cover removed.

FIG. 2 shows the details of the robotic assembly with right half 108b of the clam shell cover 108a–b removed. A carriage 200 forms the base of the robotic assembly 100. At one end of the carriage 200 are a first guide 202 and a second guide 204 These two guides 202 and 204 are cam followers, skid pads, wheels, rollers, bearings, gears, grooves or other similar rotatable or non-rotatable items. Guides 202 and 204 engage a first guide path and a second guide path respectively provided in the guide rail 102. Contact between the first guide 202 and second guide 204 and the side walls of the first guide path and the second guide path establish the orientation of the robotic assembly 100 with respect to the guide rail 102 in the X-Y plane. To minimize wear of the guides 202 and 204, and of the guide paths 302 and 304, it is preferred that the guides 202 and 204 are rotatably attached to the carriage 200. In the preferred embodiment, the first guide 202 and second guide 204 also contact the floor of the first guide path and second guide path respectively to support the weight of the robotic assembly 100 in the Z axis.

Since the weight of the robotic assembly 100 is supported at only one end of the carriage 200, gravity applies a force to rotate the robotic assembly 100 out of the X-Y plane. To prevent this rotation, a third guide 206 is provided on the carriage 200 to engage a guide surface provided on the guide rail 102 situated below the first guide path and the second guide path. This guide configuration offers a couple advantages when the third guide 206 is a wheel, roller or gear with motive power supplied by a drive motor 208 on the carriage 200. First, the moment load caused by the weight of the robotic assembly 100 forces the third guide 206 against the guide surface of the guide rail 102. This force helps the third guide 206 maintain contact and friction with the guide surface for propulsion purposes. Second, locating the third guide 206 near the Y-Z plane passing through the first guide 202 and the Y-Z plane passing through the second guide 204, minimizes the coupling load about the Z axis created during powered acceleration and deceleration caused by the drive motor 208. The torque induced about the X axis by acceleration and deceleration is countered by spacing the first guide 202 and second guide 204 along the Y axis away from the center of gravity of the robotic assembly 100.

Figure 3:
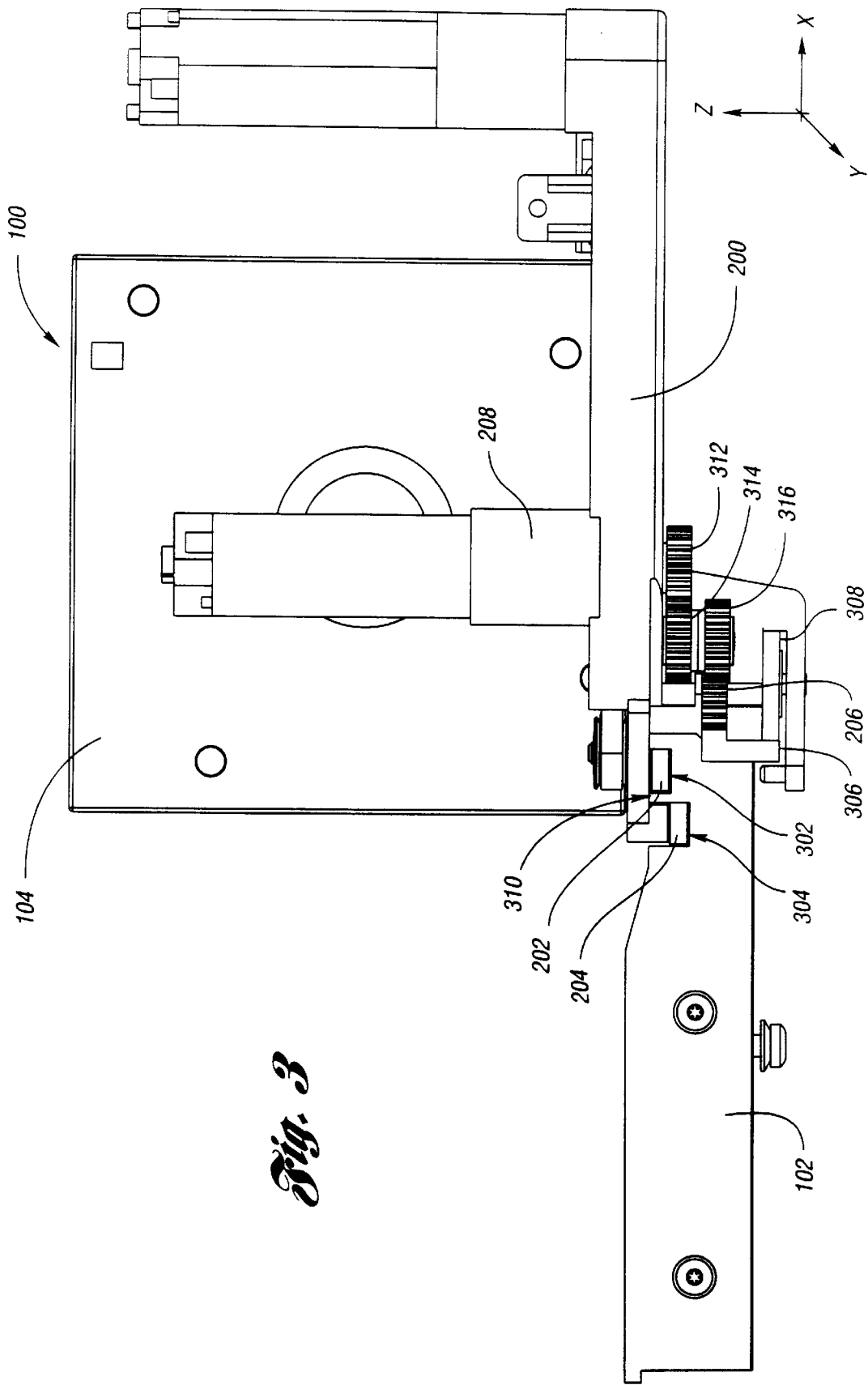
FIG. 3 is a partial side view showing the robotic assembly suspended from the guide rail.

FIG. 3 shows the preferred embodiment of the robotic assembly 100 suspended from the guide rail 102. The clam shell cover 108a–b has been removed in FIG. 3 for clarity. The first guide path 302 and the second guide path 304 are channels provided in the guide rail 102 with the first guide 202 and the second guide 204 disposed inside the channels provided in the guide rail 102. Alternatively, the first guide path 302 and the second guide path 304 may be bosses protruding up from the guide rail 102 with the first guide 202 and the second guide 204 slotted. As mentioned earlier, the first guide 202 and second guide 204 also contact the floors of the first guide path 302 and the second guide path 304 respectively to support the weight of the robotic assembly 100. To carry the load of the robotic assembly 100 in a more efficient manner, an additional set of guides (not shown) with an X axis of rotation may be included in the design. These additional guides may engage the guide rail 102 in any combination of the first guide path 202, the second guide path 206, or a support surface 310. In another alternative, the support surface 310 may be extended in an upward direction along the Z axis to directly engage and support the carriage 200. In this alternate configuration, the carriage 200 must slide on the support surface 310.

In the preferred embodiment the third guide 206 is a drive gear and the guide surface 306 on the guide rail 102 includes a rack gear. An optional wheel 308 may be coaxially mounted to the third guide 206 and positioned to engage the guide surface 306 below the teeth of the rack gear. Wheel 308 unloads the drive gear from the rack gear resulting in smoother movement of the robotic assembly 100.

Power to drive the third guide 206 is supplied by a drive motor 208 mounted on-board the carriage 200 in the preferred embodiment. Torque from the drive motor 208 is coupled to the third guide 206 through a set of reduction gears, such as gears 312, 314 and 316. In alternate embodiments of the present invention, torque from the drive motor 208 may be coupled to the any one or combination of the first guide 202, the second guide 204 and/or the third guide 206. When the third guide 206 is not required to provide motive power for the robotic assembly 100, then the third guide 206 may be a non-rotating cam follower, skid pad or similar sliding device, and the rack gear is not required.

Figure 4:
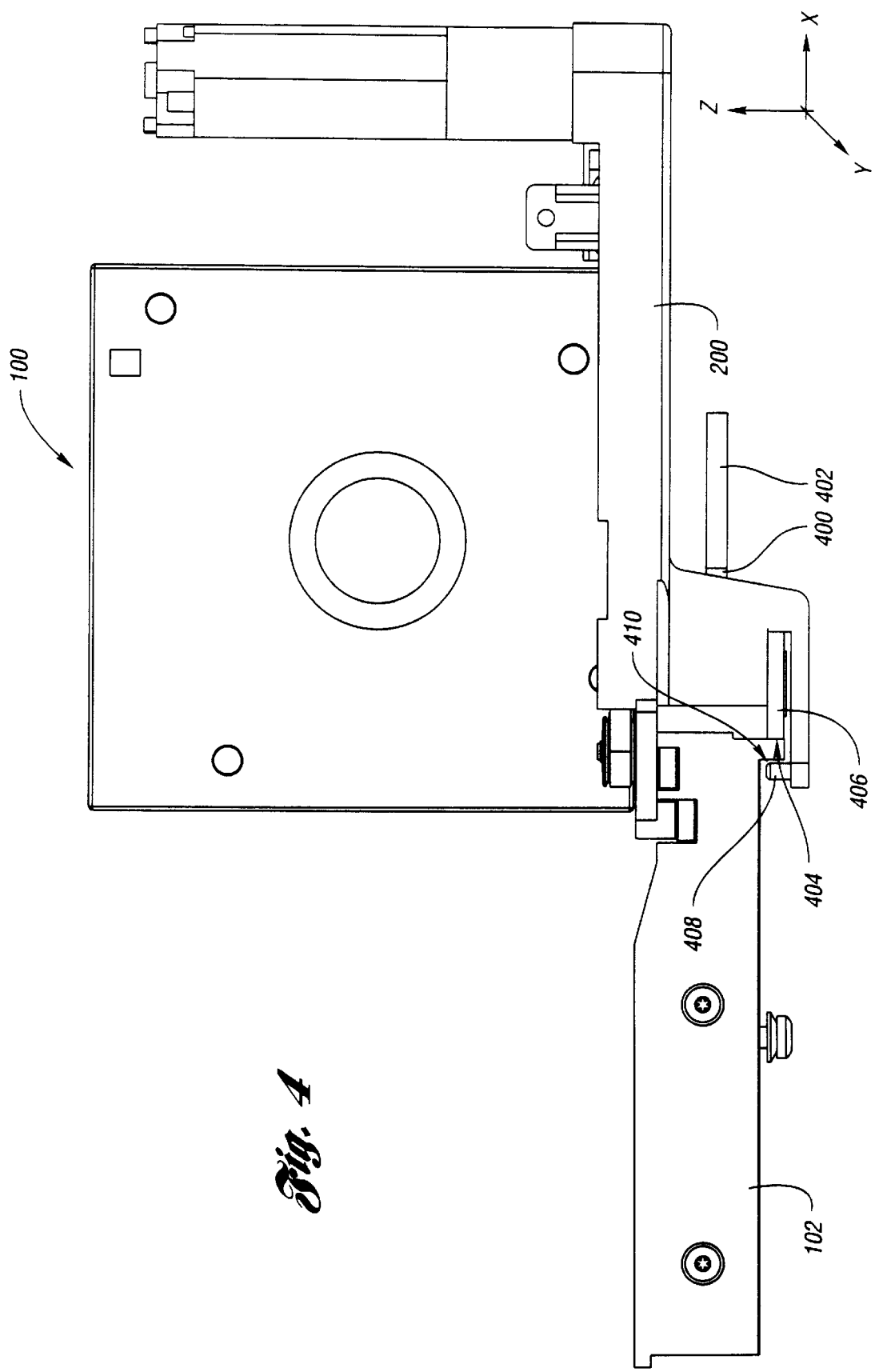
FIG. 4 is a partial side view of a second embodiment.

Other configurations may be employed within the present invention to provide Y axis propulsion to the robotic assembly 100. In FIG. 4, for example, Y axis propulsion is provided by a belt 400 coupled to the carriage 200. The belt 400 is moved back and forth by a motor (not shown) mounted off of the carriage 200. The route of the belt 400 is defined by a series of rollers 402 (only one of which is shown) that are sized and positioned to parallel the route of the guide rail 102. One advantage of this form of propulsion is that the weight and wiring for the drive motor 208 are eliminated from the carriage 200, making the robotic assembly 100 lighter and simpler. Another advantage is that the belt 400 helps to maintain the third guide 406 (a wheel in this embodiment) engaged with the guide surface 404 (without the rack gear) in the presence of shocks, vibrations and other disturbances that cause the free end of the robotic assembly 100 farthest from the guide rail 102 to lift upwards.

Figure 5:
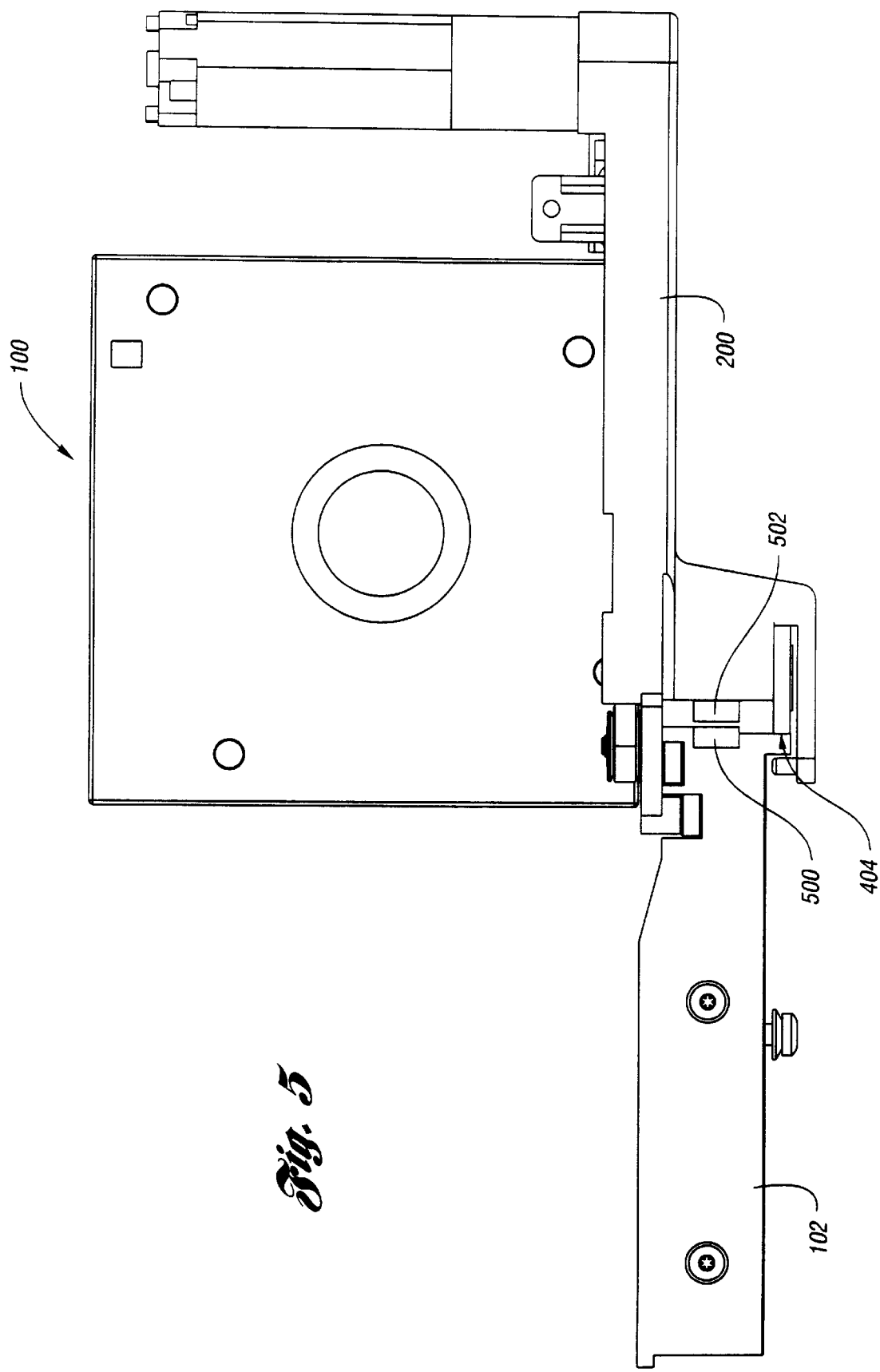
FIG. 5 is a partial side view of a third embodiment.

The robotic assembly 100 may include an additional guide 408 to help maintain the third guide 406 engages with the guide surface 404. Guide 408 is rotatably or non-rotatably attached to the carriage 200 and engages a second guide surface 410 on the guide rail 102. Guide 408 and the second guide surface 410 are positioned to prevent the robotic assembly 100 from rotating counterclockwise (as seen in the figure) out of the X-Y plane. The advantage of guide 408 is that the robotic assembly 100 is more difficult to derail accidentally than without additional guide 408. A disadvantage in including guide 408 is that it is difficult to intentionally derailed the robotic assembly 100 as part of a maintenance operation.

Where the data storage library design requires an essentially linear or constant curved guide rail 102, then a linear motor may be used to provide Y axis propulsion for the robotic assembly 100, as shown in FIG. 5. The linear motor consists of at least two components, a coil assembly 500 and a reaction plate 502. Since the coil assembly 500 requires wires to provide electrical power and the reaction plate 502 does not, a convenient arrangement of these two components is shown in FIG. 5. Here, the coil assembly 500 is statically positioned next to the guide surface 404 of the guide rail 102. The reaction plate 502 is attached to the carriage 200. In other variations, the positions of the coil assembly 500 and reaction plate 502 may be reversed, with the coil assembly 500 being attached to the carriage 200 and the reaction plate 502 being positioned next to the guide surface 404.

Orientation of the robotic assembly 100 with respect to the guide rail 102 in the X-Y plane is determined by the relative positioning between the first guide path 302, the second guide path 304, and the guide surface 306. By controlling the guide paths 302–304 and the guide surface 306, the robotic assembly 100 can be oriented perpendicular to the guide rail 102 or at any reasonable angle. The maximum reasonable angle is determined by the relative positions between the first guide 202, the second guide 204 and the third guide 206. For example, consider a top view of the robotic assembly 100 with the three guides 202, 204 and 206 forming a triangle pointing downward, where the first guide 202 is above and to the right of the third guide 206, and the second guide 204 is above and to the left of the third guide 206. When the first guide path 302 moves the first guide 202 upward, and the second guide path 304 moves the second guide 204 downward relative to the third guide 206, then the triangle (and the robotic assembly 100) rotates counterclockwise. Where the first guide path 302 moves the first guide 202 downward, and the second guide path 304 moves the second guide 204 upwards relative to the third guide 206, then the triangle rotates clockwise.

Flexibility in orienting the robotic assembly 100 with respect to the guide rail 102 provides the data storage library designer many options in the layout of the data storage library. In general, the robotic assembly 100 is oriented perpendicular to the guide rail 102 when the robotic assembly 100 is aligned with a storage media cartridge 104, a media drive, or any other media handling device. On curved sections of the guide rail 102, the robotic assembly 100 can be made to traverse the curve symmetrically or asymmetrically. The asymmetrical ability is very useful when dealing with sharp corners in the guide rail 102. With proper routing of the first guide path 302 and the second guide path 304, the robotic assembly 100 can be made to change orientation anywhere from early into the corner through near the end of the corner.

Figure 6:
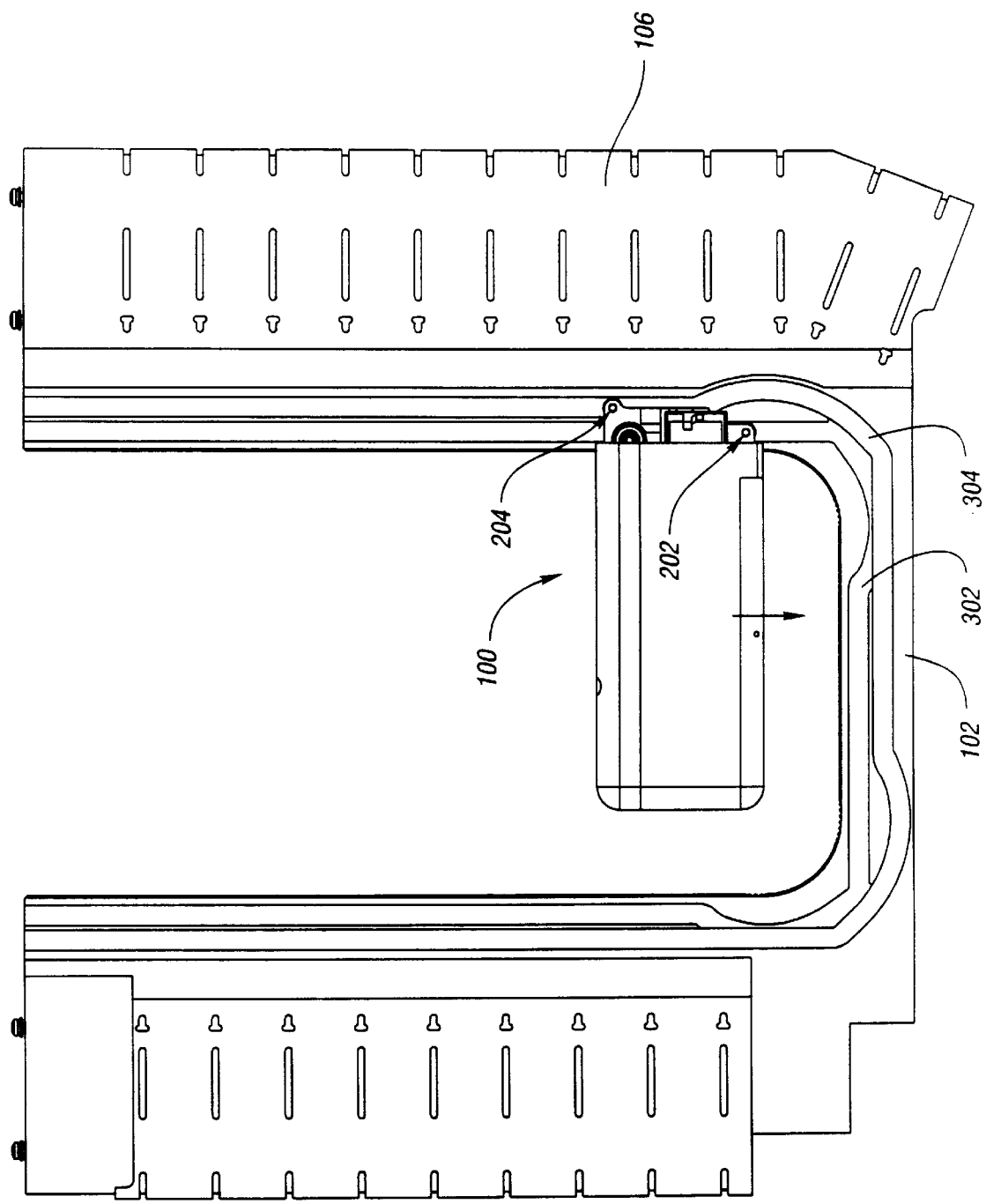
FIG. 6 is a top view of the robotic assembly on a straight section of the guide rail.
Figure 7:
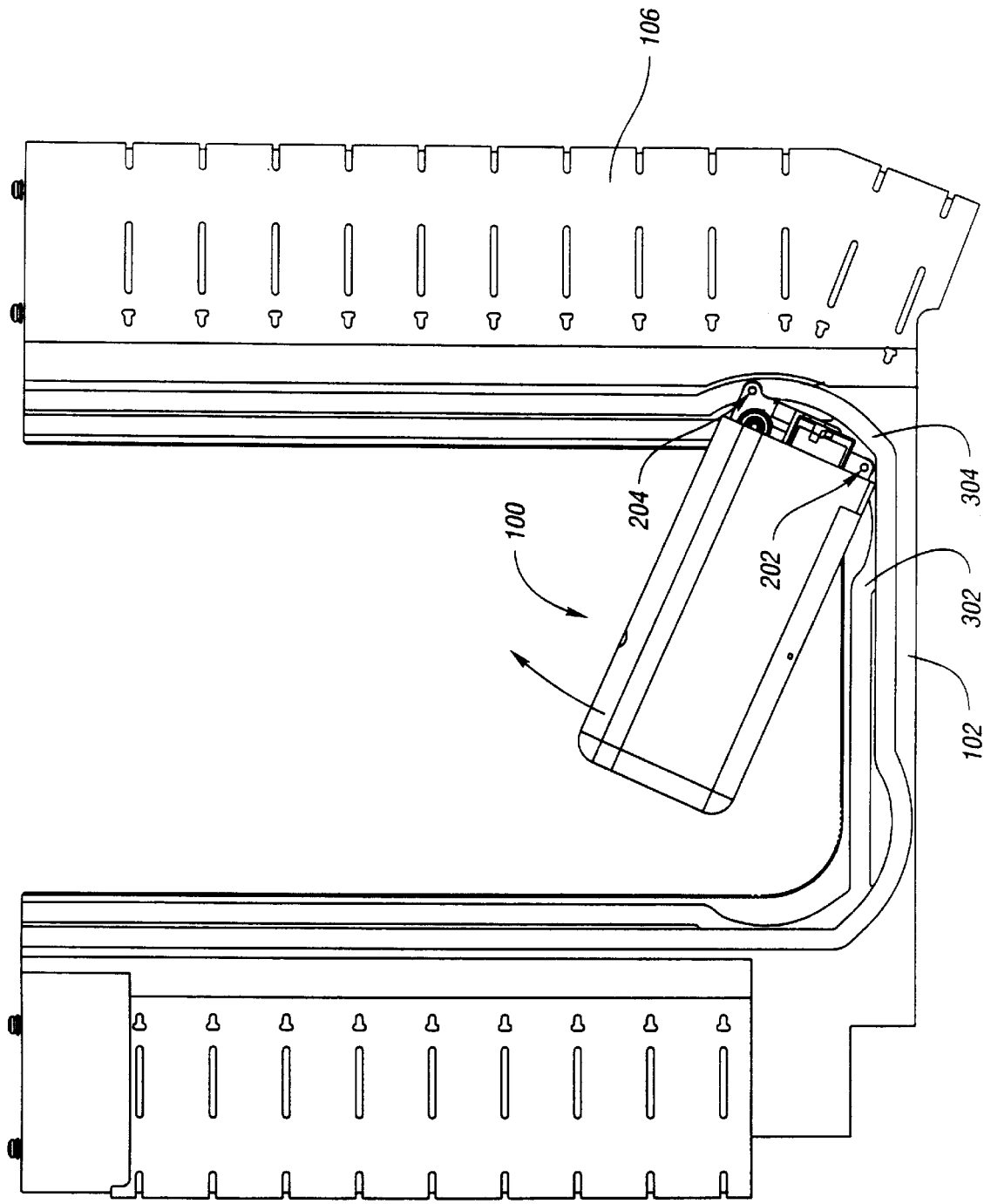
FIG. 7 is a top view of the robotic assembly on an inward curved section of the guide rail.

FIG. 6 shows an example where the first guide 202 is at the start of an asymmetrical inside corner in the lower right-hand side of a U-shaped guide rail 102. The asymmetry can be seen in the route of the first guide path 302 as compared with the second guide path 304 around the corner. Robotic assembly 100 is moving downward in this example. Note that the robotic assembly 100 remains perpendicular to the cartridge slots 106 on the right side of the data storage library until the first guide 202 reaches the curve in the first guide path 302. This asymmetry curve allows the data storage library designer to place the curve very close to the bottom cartridge slot 106 in the right column of cartridge slots 106. FIG. 7 shows the robotic assembly 100 in the middle of the curve. As this point, the robotic assembly 100 is rotating clockwise (as seen in FIG. 7) while the second guide 204 is just starting into the curve in the second guide path 304. As the robotic assembly 100 continues to traverse the curve, the guide paths 302 and 304 cause the robotic assembly 100 to continue rotating until the robotic assembly 100 has rotated 90 degrees from its starting orientation shown in FIG. 6.

Figure 8:
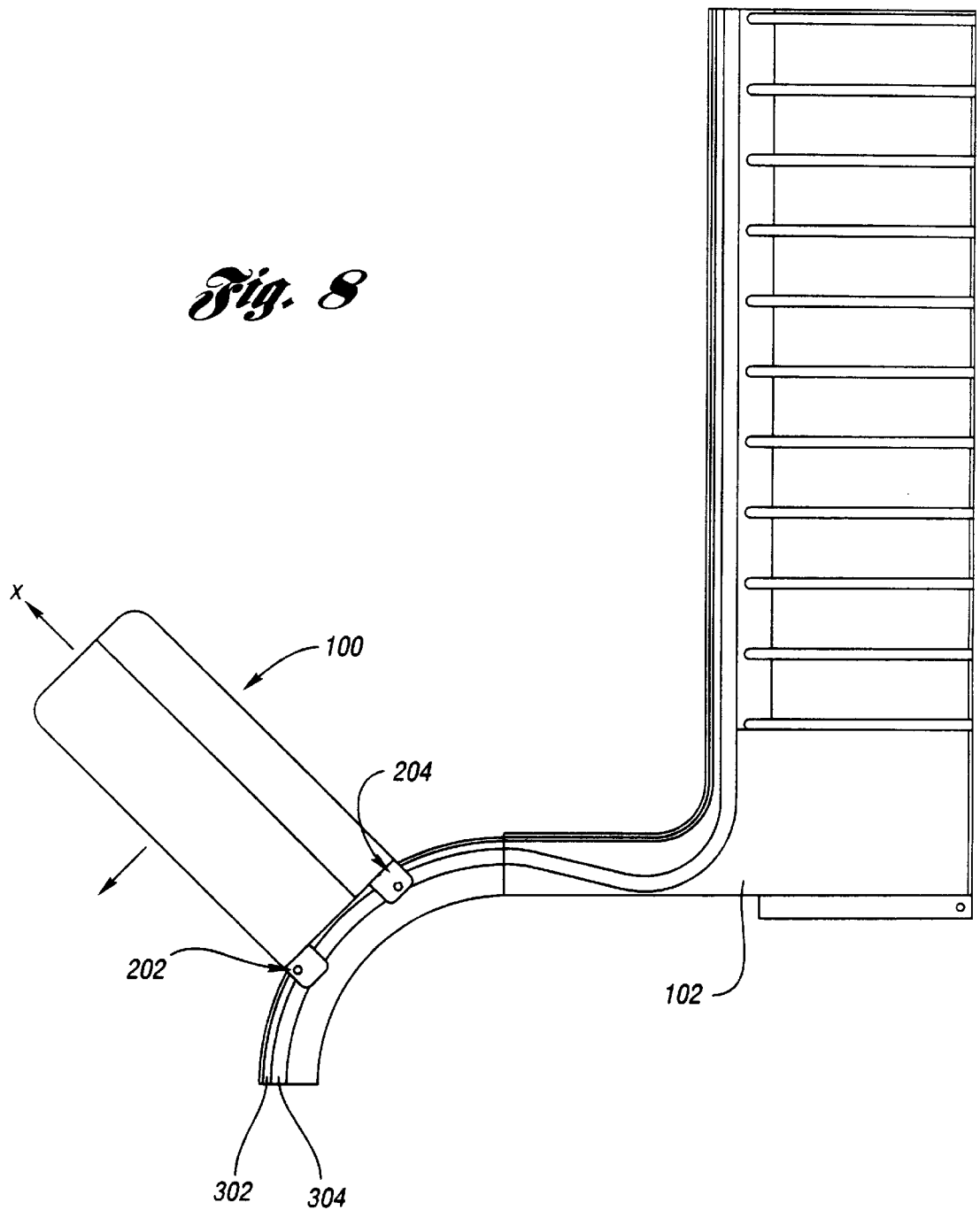
FIG. 8 is a top view of the robotic assembly on an outward curved section of the guide rail.

FIG. 8 shows another example of the robotic assembly 100 transitioning a symmetrical outside curve in the guide rail 102. In this example, the first guide path 302 and the second guide path 304 remain an equal distance apart from each other through the entire curve. As the first guide 202 enters the curve in the first guide path 302, the X axis of the robotic assembly 100 will rotate slightly away from perpendicular to the guide rail 102 because the second guide 204 has not yet entered the curved portion of the second guide path 304. When the second guide 304 reaches the curve in the second guide path 304, the X axis of the robotic assembly 100 will again be oriented perpendicular to the guide rail 102. This transition in the orientation of the robotic assembly 100 with respect to the guide rail 102 repeats in the opposite direction as the robotic assembly 100 leaves the curved.

Figure 9:
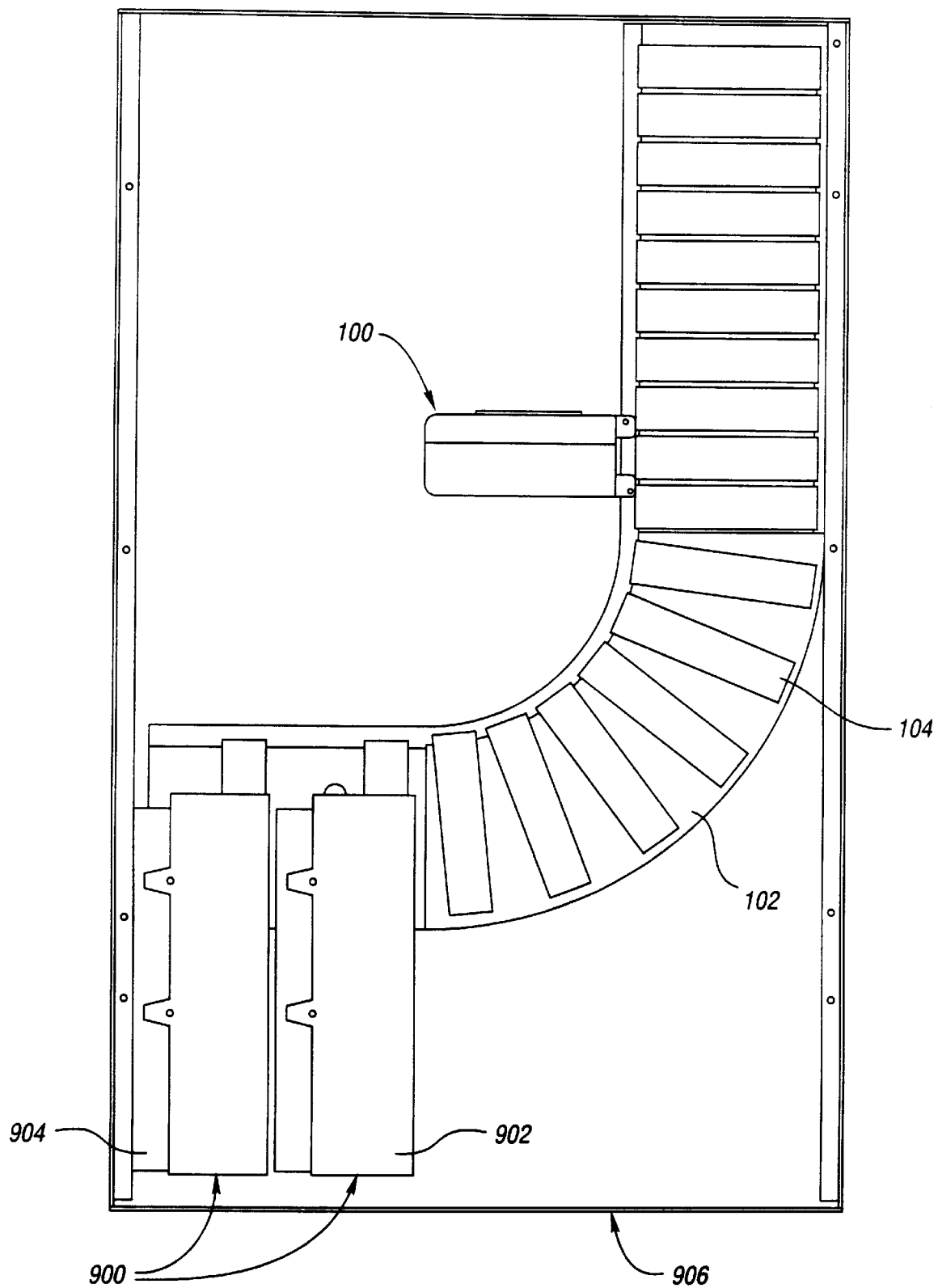
FIG. 9 is a top view of a J-shaped guide rail.

The ability to incorporate curved and straight sections in the route of the guide rail 102 allows for an endless variety of data storage library configurations. Designers are no longer limited to configurations where the robotics move in straight paths or rotate through fixed radius curves, although the present invention does allow for such configurations if desired. Two examples of curve-linear guide rails 102 have been shown in FIG. 7 and FIG. 8. Another example is shown in FIG. 9 where a J-shaped guide rail 102 is routed within a nineteen inch wide rack mount space. In this example, the data storage library takes advantage of the depth of the library to house the bulk of the storage media cartridges 104. At the same time, this configuration allows for easy access to the back side 900 of the media drives 902 and 904 from the back side 906 of the data storage library for cabling purposes. The ability to control the orientation of the robotic assembly 100 with respect to the guide rail 102 at any point along the guide rail 102 allows additional storage media cartridges 104 to be positioned along the curved portion of the J-shape, thus increasing the overall storage capacity of the data storage library.

Figure 10:
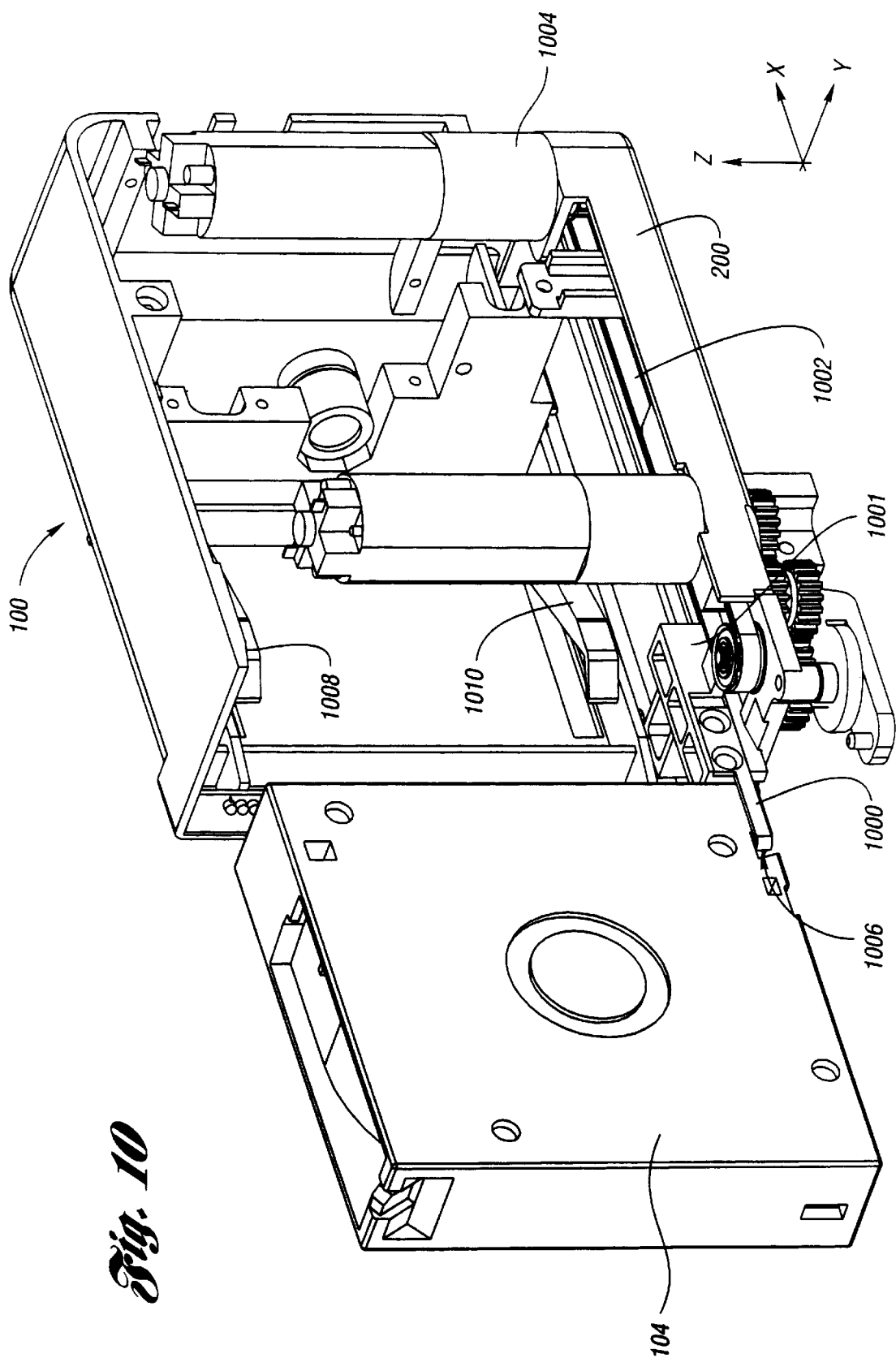
FIG. 10 is a perspective view of the robotic assembly grabbing a storage media cartridge.
Figure 11:
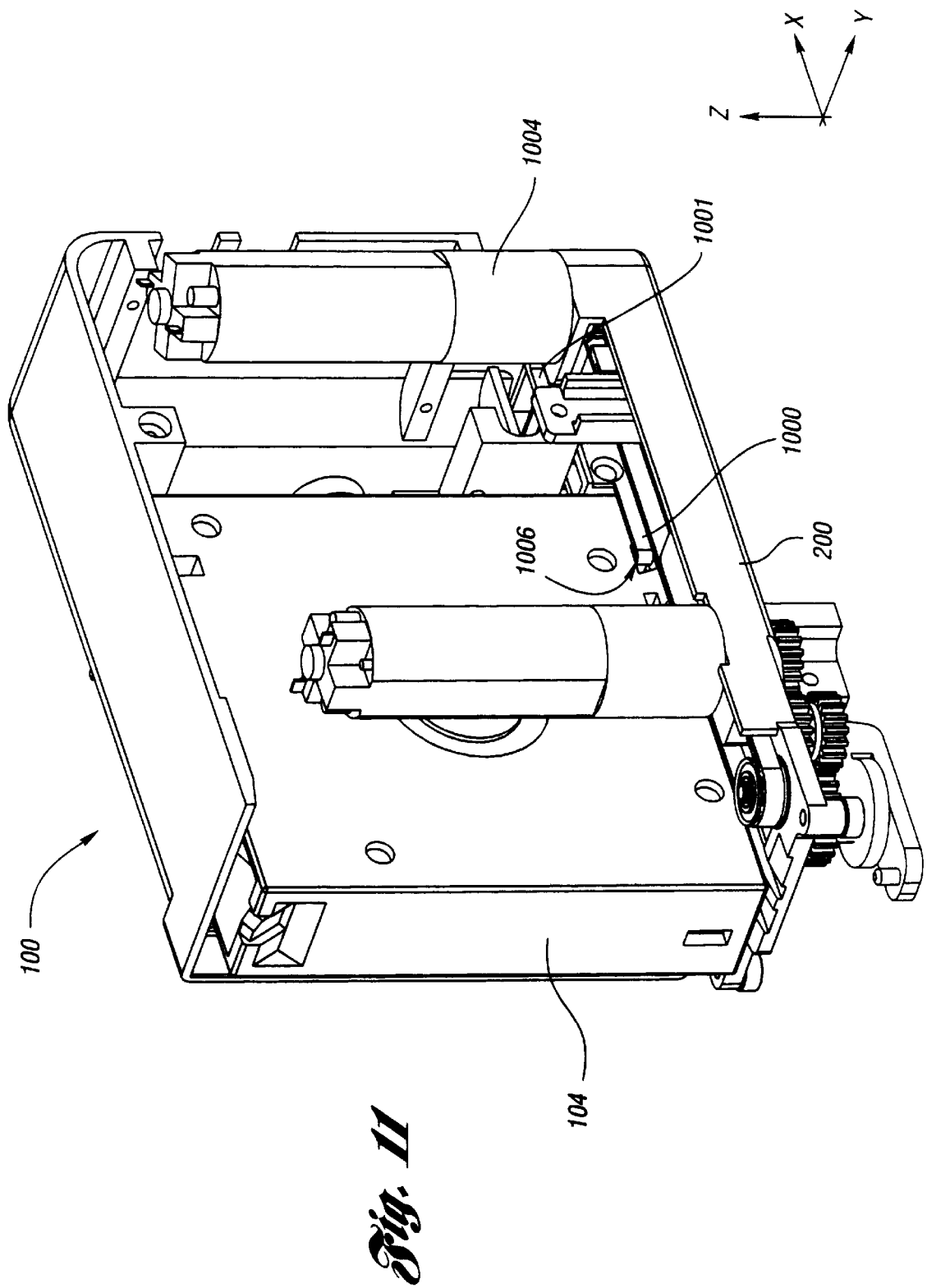
FIG. 11 is a perspective view of the storage media cartridge pulled inside the robotic assembly.

In order to transport storage media cartridges 104, the robotic assembly 100 includes a picker assembly that can load and unload at least one storage media cartridge 104 at a time. The preferred embodiment of the picker assembly is shown in FIG. 10. The picker assembly includes a hook 1000 attached to a block 1001. Block 1001 is attached to a belt 1002. Belt 1002 is driven by a hook extension motor 1004. Loading of a storage media cartridge 104 begins by aligning the robotic assembly 100 adjacent the storage media cartridge 104, with a slight offset in the positive Y axis direction so that the extended hook 1000 is along side the storage media cartridge 104. Next, the robotic assembly 100 is moved in the negative Y axis direction to cause the hook 1000 to enter a mating slot 1006 in the storage media cartridge 104. Hook extension motor 1004 then retracts the hook 1000 dragging the storage media cartridge 104 with it onto the carriage 200, as shown in FIG. 11. Referring back to FIG. 10, a top cartridge guide 1008 and a side cartridge guide 1010 hold the storage media cartridge 104 in place while the storage media cartridge 104 is loaded in the robotic assembly 100. To unload the storage media cartridge 104, the process is reversed. The hook extension motor 1004 extends block 1001 pushing the storage media cartridge 104 off of the carriage 200. Next the robotic assembly 100 is moved slightly in the positive Y axis direction to remove the hook 1000 from the mating slot 1006. Hook 1000 is then retracted leaving the robotic assembly 100 clear to move along the Y axis in either direction.

Absolute position sensing of the robotic assembly 100 at any point along the guide rail 102 can be determined in any one of several ways. Typically, a relative position encoder is embedded in the drive motor 208. A zero position is defined as one end of the guide rail 102, assuming that the guide rail is not a continuous loop. Pulses from the relative position encoder are counted to determine the distance the robotic assembly 100 has traveled from the zero position. Another method of determining position is to attach targets at key positions along the guide rail 102. For example, one target may be positioned at the center of each cartridge slot 106, each media drive, and each media handling device. A sensor mounted on the carriage 200 is used to detect these targets and align the robotic assembly 100 accordingly. Alternatively, the target may be mounted in the carriage 200 and the sensors attached at key positions along the guide rail 102.

Each storage media cartridge 104 hay have a bar code that uniquely identifies each storage media cartridge 104. Referring back to FIG. 2, the robotic assembly may include an optional bar code reader for reading the bar codes on the storage media cartridges 104. The preferred bar code reader consists of a light emitting diode (LED) array 210, a lens 212 and a charged couple device (CCD) linear detector array 214. The bar code (not shown) on the desired storage media cartridge 104 is read while the desired storage media cartridge 104 is sitting in its cartridge slot 106 with the bar code facing the robotic assembly 100. The LED array 210 provides illumination of the bar code. Lens 212 focuses an image of the illuminated bar code onto the CCD linear detector array 214 creating a pattern of brightness (no bar) and darkness (bar) on the individual cells within the CCD linear detector array 214. The bar code is then read by examining the light intensity measured by the individual cells within the CCD linear detector array 214. Other variations of bar code readers, and mounting configurations of the bar code reader may be used within the scope of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A robotic guidance mechanism for transporting a storage media cartridge in a data storage library, the robotic guidance mechanism comprising:

a guide rail having a first guide path, a second guide path, and a guide surface;

a carriage disposed to one side only of the guide rail horizontally;

a plurality of guides attached to the carriage, wherein a first guide and a second guide of the plurality of guides are disposed in the first guide path and the second guide path respectively, and a third guide of the plurality of guides engages the guide surface; and a picker assembly disposed on the carriage, the picker assembly being operative to load and unload the storage media cartridge from the carriage.

2. The robotic guidance mechanism of claim 1 wherein at least one guide of the plurality of guides is rotatable, the robotic guidance mechanism further comprising a motor mounted on the carriage and coupled to at least one guide to rotate the at least one guide.

3. The robotic guidance mechanism of claim 2 wherein the at least one guide coupled to the motor is the third guide.

4. The robotic guidance mechanism of claim 3 wherein the third guide is a drive gear and the guide surface of the guide rail includes a rack gear engaged by the drive gear.

5. The robotic guidance mechanism of claim 4 further comprising a wheel coaxially attached to the drive gear and engaging the guide surface to unload the drive gear from the rack gear.

6. The robotic guidance mechanism of claim 1 further comprising a linear motor having at least two components, a coil assembly and a reaction plate, wherein one component of the at least two components is mounted on the guide rail and the other component of the at least two components is mounted on the carriage.

7. The robotic guidance mechanism of claim 1 further comprising:

a belt attached to the carriage and operative to move approximately parallel to the guide rail; and a motor coupled to the belt to move the belt.

8. The robotic guidance mechanism of claim 1 wherein the first guide and the second guide of the plurality of guides are fixedly attached to the carriage.

9. The robotic guidance mechanism of claim 1 wherein the first guide and the second guide of the plurality of guides are rotatably attached to the carriage.

10. The robotic guidance mechanism of claim 1 further comprising:

a support surface provided on the guide rail; and a fourth guide and a fifth guide of the plurality of guides engaging the support surface to support the carriage vertically.

11. The robotic guidance mechanism of claim 1 further comprising:

a second guide surface provided on the guide rail; and another guide of the plurality of guides engaging the second guide surface to maintain the third guide of the plurality of guides engaged with the guide surface.

12. The robotic guidance mechanism of claim 1 wherein at least one storage media cartridge has a bar code, the robotic guidance mechanism further comprising a bar code reader disposed on the carriage for reading the bar code on the at least one storage media cartridge.

13. The robotic guidance mechanism of claim 1 wherein the guide rail has at least one curved section and at least one straight section.

14. The robotic guidance mechanism of claim 13 wherein the guide rail is J-shaped.

15. The robotic guidance mechanism of claim 13 wherein the guide rail is U-shaped.

16. A robotic assembly for transporting storage media cartridges along a guide rail in a data storage library, wherein the guide rail has a first guide path, a second guide path and a guide surface, the robotic assembly comprising:

a carriage disposed to one side only of the guide rail horizontally;

a plurality of guides attached to the carriage, wherein a first guide and a second guide of the plurality of guides engage the first guide path and the second guide path respectively, and a third guide of the plurality of guides engages the guide surface; and a picker assembly disposed on the carriage, the picker assembly being operative to load and unload the storage media cartridge from the carriage.

17. The robotic assembly of claim 16 wherein at least one guide of the plurality of guides is rotatable, the robotic assembly further comprising a motor mounted on the carriage and coupled to at least one guide to rotate the at least one guide.

18. The robotic assembly of claim 17 wherein the at least one guide coupled to the motor is the third guide.

19. The robotic assembly of claim 18 wherein the guide rail includes a rack gear, and the third guide is a drive gear that engages the rack gear.

20. The robotic assembly of claim 19 further comprising a wheel coaxially attached to the drive gear and engaging the guide surface.

21. The robotic assembly of claim 16 further comprising a linear motor having at least two components, a coil assembly and a reaction plate, wherein one component of the at least two components is mounted on the guide rail and the other component of the at least two components is mounted on the carriage.

22. The robotic assembly of claim 16 wherein the carriage is a attached to a belt that is operative to move approximately parallel to the guide rail.

23. The robotic assembly of claim 16 wherein the first guide and the second guide of the plurality of guides are fixedly attached to the carriage.

24. The robotic assembly of claim 16 wherein the first guide and the second guide of the plurality of guides are rotatably attached to the carriage.

25. The robotic assembly of claim 16 wherein the plurality of guides further comprises a fourth guide and a fifth guide engaging the guide rail to support the carriage vertically.

26. The robotic assembly of claim 16 wherein the plurality of guides further comprises another guide engaging the guide rail to maintain the third guide of the plurality of guides engaged with the guide surface.

27. The robotic guidance mechanism of claim 16 wherein at least one storage media cartridge has a bar code, the robotic assembly further comprising a bar code reader disposed on the carriage for reading the bar code on the at least one storage media cartridge.

28. A guide rail for guiding a robotic assembly having a plurality of guides defining a first guide, a second guide, and a third guide, the guide rail comprising:

a first guide path for guiding the first guide of the plurality of guides of the robotic assembly;

a second guide path for guiding the second guide of the plurality of guides of the robotic assembly; and a guide surface for engaging the third guide of the plurality of guides of the robotic assembly, and the guide rail being arranged to be on one side only of the robotic assembly horizontally.

29. The guide rail of claim 28 wherein the third guide of the plurality of guides is a drive gear, and the guide surface includes a rack gear for engaging the drive gear.

30. The guide rail of claim 28 wherein the robotic assembly includes a fourth guide and a fifth guide of the plurality of guides for vertical support, the guide rail further comprising a support surface for engaging the fourth guide and fifth guide of the plurality of guides of the robotic assembly.

31. The guide rail of claim 28 wherein the robotic assembly includes another guide of the plurality of guides to maintain the third guide of the plurality of guides engaged with the guide surface, the guide rail further comprising a second guide surface for engaging the other guide of the plurality of guides of the robotic assembly.

32. The guide rail of claim 28 wherein the guide rail has at least one curved section and at least one straight section.

33. The robotic guidance mechanism of claim 32 wherein the guide rail is J-shaped.

34. The robotic guidance mechanism of claim 32 wherein the guide rail is U-shaped.

* * * * *